United States Patent [19]

Bagley

[11] Patent Number: 4,801,131
[45] Date of Patent: Jan. 31, 1989

[54] WORK HOLDING DEVICE

[76] Inventor: Jeffrey W. Bagley, 1776 El Codo Way, San Jose, Calif. 95124

[21] Appl. No.: 110,135

[22] Filed: Oct. 19, 1987

[51] Int. Cl.⁴ .............................................. B23Q 1/04
[52] U.S. Cl. ...................................... 269/75; 269/108
[58] Field of Search ................... 269/45, 75, 97–98, 269/254 R, 254 CS, 108; 248/180

[56] References Cited

U.S. PATENT DOCUMENTS

| | | |
|---|---|---|
| 10,985 | 5/1854 | Gregg . |
| 38,273 | 4/1863 | Allen . |
| 65,449 | 7/1867 | Tate . |
| 86,173 | 1/1869 | Maynard . |
| 320,224 | 6/1885 | Colton . |
| 454,553 | 6/1891 | Whitten . |
| 687,183 | 11/1901 | Kolander . |
| 2,140,307 | 2/1979 | Dalman et al. . |
| 2,559,925 | 7/1951 | Barker . |
| 2,669,958 | 2/1954 | Sweeney ........................ 269/75 |
| 3,112,104 | 11/1963 | Jerore ........................... 269/75 |
| 4,070,011 | 1/1978 | Glesser ......................... 269/75 |
| 4,214,739 | 7/1980 | Dailey . |

FOREIGN PATENT DOCUMENTS 762756  12/1956  United Kingdom ................. 269/75

Primary Examiner—Robert C. Watson
Attorney, Agent, or Firm—Gerald L. Moore

[57] ABSTRACT

A work holding device for holding a work fixture [11] so that it can be removably attached to a workbench [12] including a base member [30] attached to the work bench, a pivotable ball [48] fixed to the work fixture, a second member for receiving the base member and pivotable ball, and a clamp [40] for holding the base member and pivotable ball rigidly together.

6 Claims, 2 Drawing Sheets

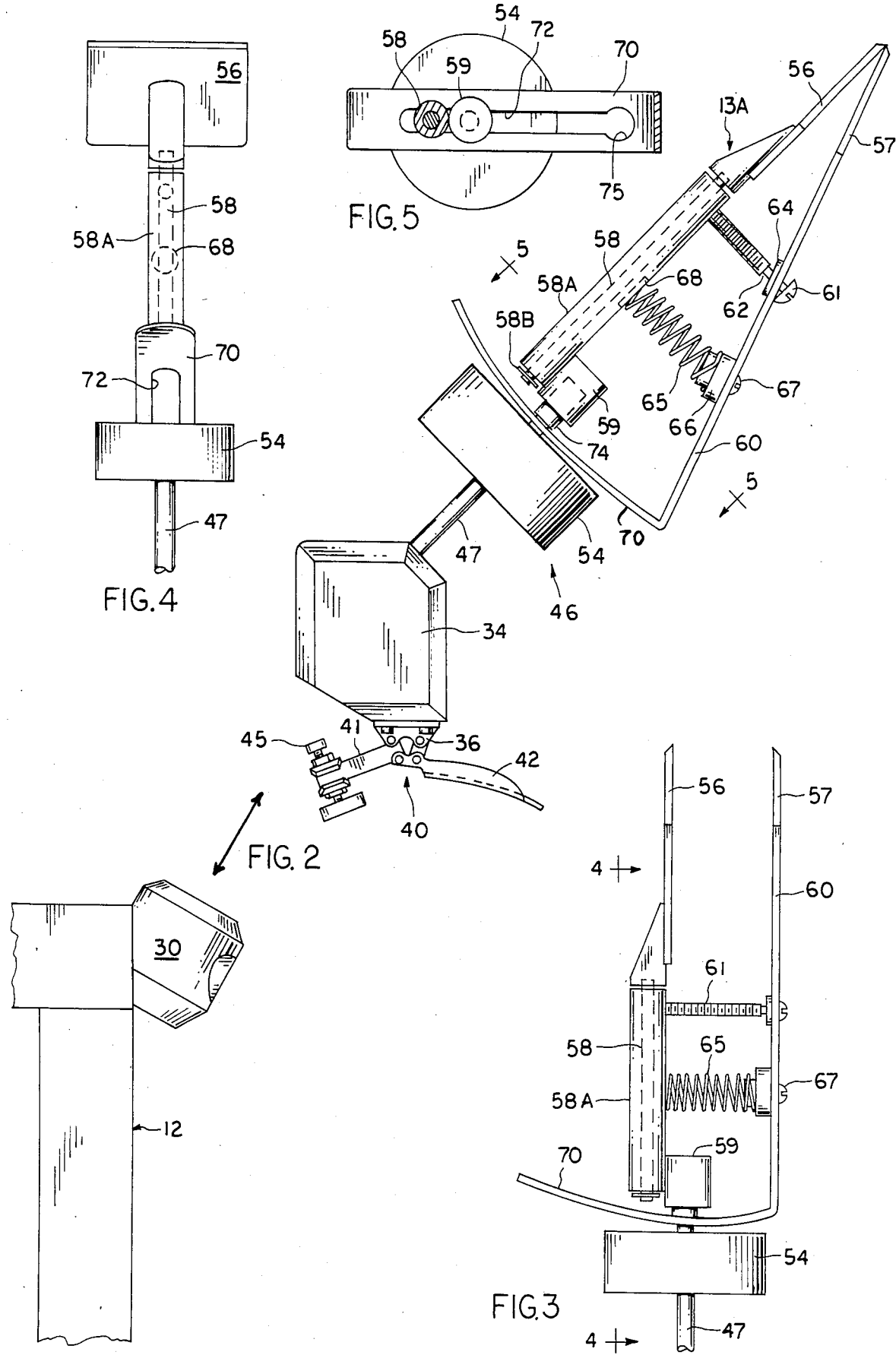

WORK HOLDING DEVICE

BACKGROUND OF THE INVENTION

1. Field of the Invention

A work holding device which can be removably attached to a work bench, and by the release of one clamp, can be set at various angles for optimum positioning of the work or can be removed from the work bench.

2. Description of the Prior Art

This invention relates to work holders of the type that are fastened to a bench or table for holding such articles as jewelry, printed circuit boards and the like so that fabrication and assembly processes can be carried out. These work holders of necessity need to be relatively small so as not to interfere with access to the work. Additionally such work holders need to allow the work to be oriented in many different attitudes so that access is available from all sides of the work.

It is also important that such work holders be removable so that they can be taken off of the work bench and put out of the way while other work is being done. Each of the above requirements dictate that the optimum work holder is relatively inexpensive, has as few parts as possible and takes up as little room as possible while still providing a somewhat rigid support for the work. It is to these ends that the subject invention is directed.

SUMMARY OF THE INVENTION

A work support device including a base member adapted to be fixed to a work bench or the like, a work fixture for attachment to the work and held by a support member, a second member forming a cavity for receiving both the support member and the base member with clamping means attached to tightly engage the base member and support member and hold the work fixture rigidly.

DESCRIPTION OF THE DRAWINGS

FIG. 2 shows the work holder removed from the table with a different work fixture attached;

FIG. 3 shows the work fixture of FIG. 2 opened to receive a workpiece;

FIG. 4 is a view along the line 4—4 of FIG. 3; and

FIG. 5 is a view along the line 5—5 of FIG. 2.

DESCRIPTION OF A PREFERRED EMBODIMENT

Figure 1:
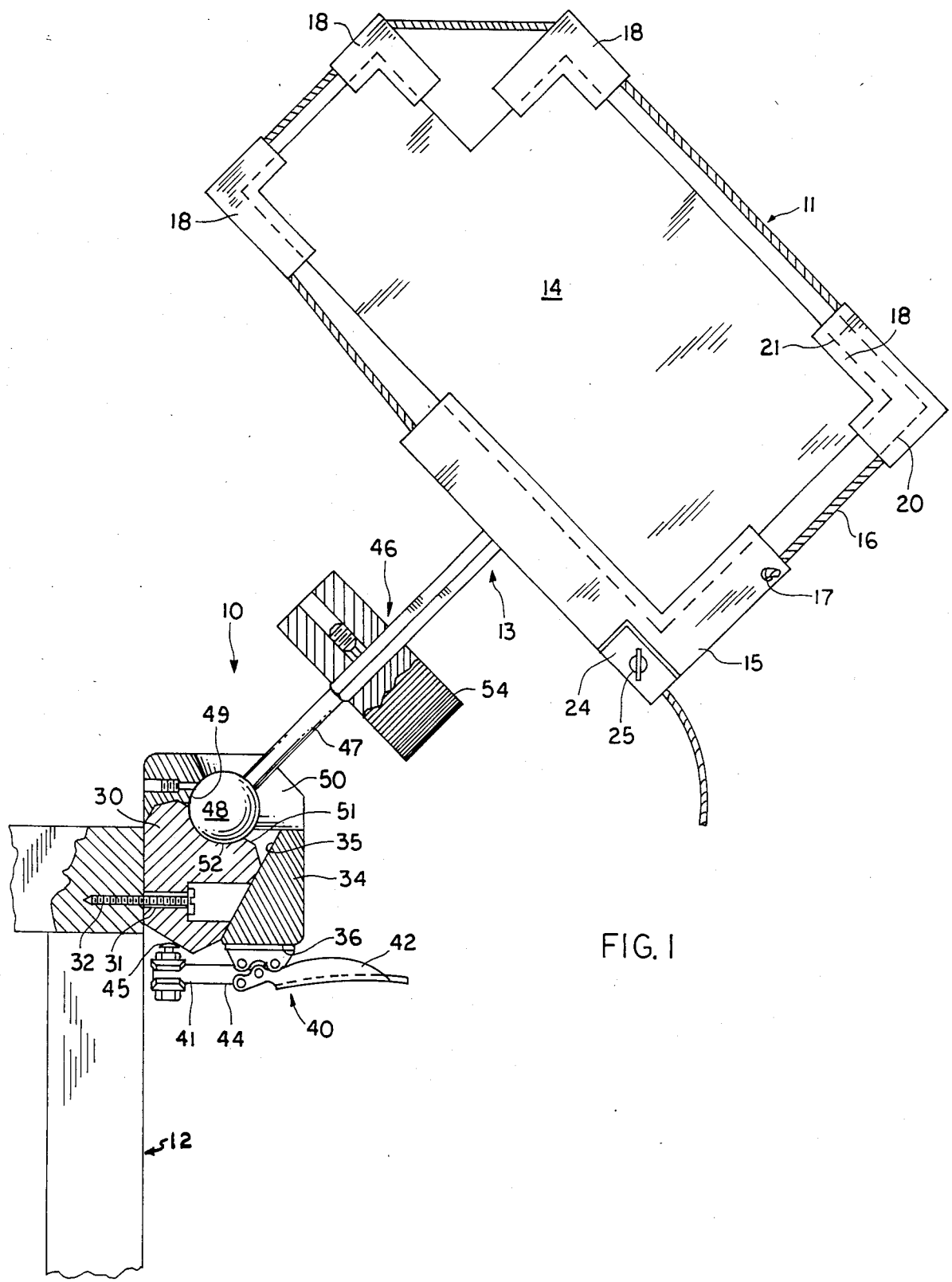
FIG. 1 is a side view, partially in cross section, showing the work holder fixed to a bench and supporting a work fixture.

In FIG. 1 is shown a work holder 10 used for rigidly supporting a workpiece 11 on a table 12. The workpiece comprises a printed circuit board 14 which is held in a work fixture 13 comprising a cradle 15 to which is fastened a tension wire 16 having one end 17 fixed to the cradle. The wire is extended around a series of removable corner mounts 18 by passage through a slot 20 therein while the corner mounts include a second slot 21 which fits around the corners of the printed circuit board. The wire 16 is pulled through a clamp 24 and a screw 25 is tightened down after the wire is threaded around the corner mounts. Thus the wire is held in tension while extending around the corner mounts to hold the printed circuit board firmly in place.

The work holding device 10 comprises a first member or base block 30 including a pair of screw holes 31 through which screws 32 can be passed and threaded into the table 12. The base block 30 serves as a support for a second member or support block 34 which includes an opening 35 extending from the bottom side 36 and having a cross section which fits the outer cross section of the base block. Thus the support block can be slipped down onto the base block and held in place by clamping means comprising a clamp 40 which generally includes a force arm 41 and an actuating handle 42 pivotally connected and attached to a bracket 44 fixed to the support block. By rotating the arm 42 in the counter-clockwise direction, the force arm is rotated in the clockwise direction about the bracket so as to bring the contact screw end 45 into engagement with the bottom edge of the base block 30. The pressure that is exerted on the base block is adjustable by turning the contact screw head 45A inward or outward relative to the force arm. Thus, the block 34 can be adjusted for more difficult or easier movement relative to the base block 30.

The work support means 46 comprises a shaft 47 having attached at the upper end the work fixture 13 or any other suitable work attaching member and having fixed at the bottom end a pivotable member or ball 48 which fits within a socket 49 forming an extension of the opening 35 in the top end of the support block 34. An opening 50 allows the shaft 47 to extend upward from the support block.

Thus as the support block 34 is placed on the base block 30 the top end of the base block abuts the ball 48. Formed in the top end of the base block is a spherical recess 52 which contacts the ball 48 and holds it tightly against the socket 49 within the support block when the clamp 40 is actuated to move the pressure arm clockwise to force the contact screw 45 against the base block. As the clamp 40 is thereafter released, the force on the base block is reduced to allow the ball 48 and the work support to be pivoted, preferably by grasping the adjustment wheel 54 to properly position the work held in the work fixture 13. Thereafter by actuating the clamp 40, the base block is again forced into close contact with the ball 48 to clamp it in the position selected. By actuating the clamp to the position shown in FIG. 2, the support block 34 can be lifted from the base block 30 to separate the work support from the table 12 leaving only the base block in place. In the manner just described, the same mechanism that allows removal of the work support from the base block also serves as the adjustment mechanism to release and lock the work support in the desired position.

As shown in FIG. 2, the work support 46 and the support block 34 can be removed from the base block 30 by releasing the clamp 40. Also other work fixtures 13 can be attached to the work support 46 such as the fixture 13A shown in FIG. 2. Shown herein is a clamp for holding jewelry and the like comprising the clamping blades 56 and 57 which are spring loaded towards each other. The blade 56 is supported on a shaft 58 that is held in a sleeve 58A welded to a stub shaft 59 that is fixed onto the wheel 54. A C-clip 58B fitted into a groove in the bottom of the shaft 58 holds the shaft in the sleeve. By holding the blade 56 on a shaft 58 that can rotate, the blade is allowed to turn and adjust to irregularly shaped articles.

The blade 57 is rigidly fixed to the pivot member 60 supported on a bolt 61 threaded ;into the shaft 58. A shoulder 62 and a washer 64 support the pivot member on the bolt. A spring 65 compressed between the pivot member and the sleeve 58A biases these members apart which forces the clamping blades together. The spring is held in place between a stub shaft 66 fixed to the pivot member by a screw 67, and a well 68 in the sleeve 58A.

To guide the pivot member 60 relative to the shaft 58 for precise positioning of the blade 57 relative to the blade 56, an extension 70 is formed by bending the pivot member nearly at right angles and thereafter in an arcuate configuration so as to intersect the base of the stub shaft 59. The stubshaft base is recessed to receive a slot 72 in the extension 70 (see FIG. 5). Additionally the recess in the stubshaft includes a shoulder 74 for receiving the enlarged area 75 of the slot 72. Thus the blades can be forced apart by squeezing on the shaft 58 and the pivot member 60 on the ends adjacent the spring 65 in the manner shown in FIG. 3. The slot 72 rides along the recessed base of the stubshaft until the enlarge area 75 aligns therewith and this area then springs up in the shoulder 74 to hold the blades apart. By pressing the extension towards the wheel 54 the blades can again be allowed to come together under force of the spring 65. The blade 56 will adjust to the configuration of a workpiece between the blades because the shaft 58 will turn within the sleeve 58A.

I claim

1. A work holding device for releasably attaching a work fixture comprising:
   a base member adapted to be attached to a work bench or the like;
   a pivotable member fixed to the work fixture;
   a second member having a single cavity sized to receive said base member and said pivotable member in abutting relationship; and
   a clamp for holding in said cavity said base member and said pivotable member.

2. A work holding device as defined in claim 1 wherein said pivotable member is a sphere fixed to a shaft.

3. A work holding device as defined in claim 2 wherein said second member cavity is circular in cross section and said base member is cylindrical shaped.

4. A work holding device as defined in claim 3 wherein said clamp is fixed to said second member in a position to releasably hold said base member and said pivotable member in said cavity.

5. A work holding device as defined in claim 4 wherein said clamp is attached to hold said pivotable member immovable relative to said base member.

6. A work holding device for releasably attaching a work fixture to a work bench, comprising:
   a base block;
   means attaching said base block to the work bench;
   a pivotable member;
   means connecting said pivotable member to the work fixture;
   a support block having a cavity to receive said base block and said pivotable member in abutting relationship; and
   a clamp actuable to clamp together in direct contact with each other said base block, pivotable member and said support block such that the work fixture is rigidly attached to the work bench and by release of the clamp the work fixture can be removed from the work bench.

* * * * *